United States Patent [19]
Pelmulder et al.

[11] 3,788,470
[45] Jan. 29, 1974

[54] METHOD OF FILTERING LIQUIDS
[75] Inventors: John P. Pelmulder, Saratoga; Cornelius Meister, San Jose, both of Calif.; Darrell W. Monroe, Deerfield, Ill.
[73] Assignee: FMC Corporation, Chicago, Ill.
[22] Filed: Sept. 20, 1971
[21] Appl. No.: 181,760

[52] U.S. Cl. .................................................. 210/78
[51] Int. Cl. ............................................ B01d 33/02
[58] Field of Search ..... 210/19, 73, 78, 360, 360 A, 210/364, 372, 373, 379, 380, 512

[56] References Cited
UNITED STATES PATENTS
3,489,679   1/1970   Davidson et al. .................... 210/19
3,627,130   12/1971  Talley ................................. 210/78
3,241,676   3/1966   Neuville et al. ................. 210/360 A
3,655,058   4/1972   Novak .............................. 210/360 R
3,241,675   3/1966   Pashaian et al. ..................... 210/73

Primary Examiner—Charles N. Hart

[57] ABSTRACT

The method of straining suspended solids by rotating a filter at a high peripheral speed that is effective to maximize the effects of certain flow conditions in a liquid adjacent the filter. A layer is formed immediately adjacent the screen, which contains significantly less particulate matter than is contained in the suspension spaced from the screen to provide for a high throughput of the liquid being filtered that has a high percentage of the solids removed therefrom.

10 Claims, 5 Drawing Figures

PATENTED JAN 29 1974
3,788,470
SHEET 1 OF 2
FIG. 1
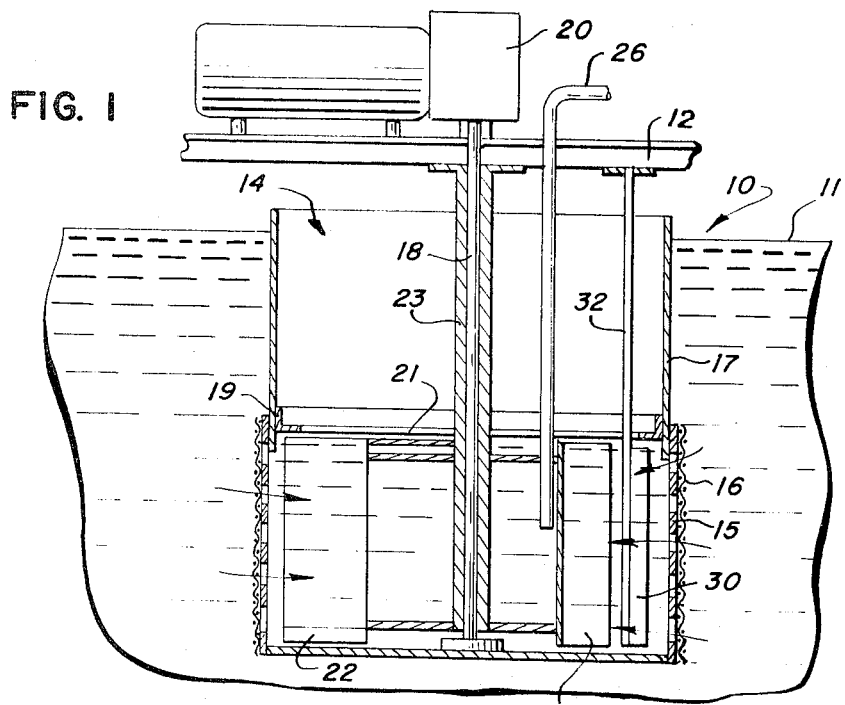
FIG. 2
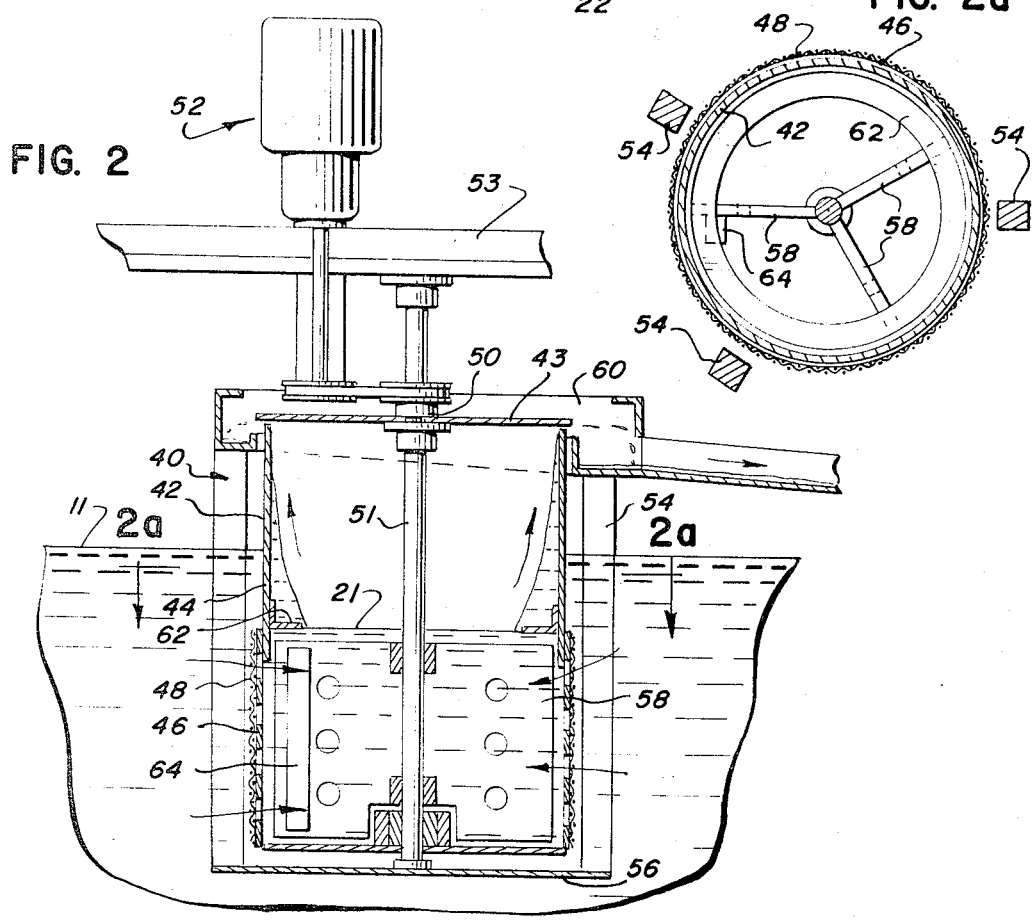
FIG. 2a

METHOD OF FILTERING LIQUIDS

This invention relates generally to the straining of suspended solids from a liquid suspension, such as, sewage, by utilizing a filter that is rotated at a high peripheral speed and through which the solution to be filtered is directed. The filter is power-driven at a peripheral speed that is sufficient to maximize the effects of certain flow conditions in the liquid adjacent the filter. Immediately adjacent the outside of the filter is established a laminar boundary layer, next to the laminar layer is a transition zone that is part laminar and part turbulent, and beyond that there exists a turbulent zone. With the extablishment of these conditions, the larger, more dense, particles of solids in the suspension are retained away from the filter in the turbulent zone, the relatively smaller, less dense particles remain in the transition zone and only the minute particles penetrate the laminar boundary layer. Most of the particles in the laminar boundary layer that are smaller than the pores in the filter media will pass through the filter and flow out with the effluent. The particles that enter the laminar boundary layer and are too big to flow through the flter become embedded in the filter media, or form as a matrix on the media.

The effluent is removed from within the filter by a pump, or allowed to flow out by gravity to a reservoir, or the like. The particles that become embedded in the filter or formed as a matrix on the media are subsequently removed therefrom by the utilization of an ultrasonic cleaning device, or other cleaning means that act to remove the particulate matter from the interstices of the filter. However, in certain cases, such as when the pores in the filter media are large enough to pass all of the solid particles which penetrate the laminar boundary layer, no cleaning device may be required to obtain satisfactory operation of the filter.

Strainers consisting of relatively slow moving, horizontally disposed filters utilizing fine porous fabrics have heretofore been employed in filtering out solids in sewage and other wastes. These filters primarily function to strain out solids larger than the pores of the fabric from the liquid suspension that is forced through the fabric under pressure. Particles in the liquid contact the filter and either flow therethrough, break up into smaller particles that ultimately flow through the filter, or become embedded in the filter media. In the event these filters become clogged, they have been cleaned by various arrangements including the utilization of ultrasonic devices. Apparatus of this type is illustrated in U.S. Pat. No. 3,489,679, which is assigned to the assignee of the present invention.

While the aforementioned filters have performed in an acceptable fashion, there are limitations as to the quantity of liquid per square foot of filter area that can be directed therethrough and the quality of the effluent that can be obtained. Typical operating conditions of prior art filters include a peripheral speed on the order of 50–150 feet per minute and a flowthrough of clarified effluent on the order of 2 to 8 gallons per minute per square foot of fabric media, with a resulting 35 percent to 65 percent of solids removal, which while suitable for some purposes, is obviously less than desirable for many applications. These systems are typically not capable of handling solids concentrations of any appreciable magnitude without a large reduction of flow rate.

In accordance with the present invention, there is provided a filter system which will permit a substantially greater throughput per unit area of filter media used, with the resulting filtered liquid having a higher quality than has heretofore been obtained with existing micro-straining filter systems. Essentially, it has been found that by operating a filter at a peripheral speed substantially in excess of that at which previously existing filters were operated, a completely unobvious result was obtained. This novel system has less tendency to clog, since, as will be discussed in substantial detail hereinafter, the larger solids in the suspension to be filterd are for the most part retained away from the filter media. However, any particles embedded in the filter media are removed therefrom by ultrasonic devices which are able to perform efficiently since a level of water is maintained inside the strainer. Other cleaning systems can also be employed and are within the purview of the present invention. Additionally, the novel method to be described herein makes use of the centrifugal and viscous forces existing in a system of this type, to aid in retaining the solids away from the filter.

The method to which the present invention is directed provides for a higher flow rate of the suspension to be clarified than has been heretofore possible to obtain with micro-straining filters and the effluent obtained has a higher degree of purity than has heretofore been possible with previously known filters. For example, in practicing the method of this invention, flow rates of 10 to 15 gallons per minute per square foot of filter media have been obtained with a percent of solids removal on the order of 90 percent.

In practicing the method of the present invention, the filter media is disposed about a drum that is driven at a relatively high peripheral speed on the order of 350–900 feet per minute. However, while this invention works very satsfactorily when operating with peripheral speeds in a range of 350 to 900 feet per minute, critical speeds, which may be substantially in excess of this upper limit, cannot be exceeded, since it may result in the establishment of a turbulent zone adjacent the drum that will eliminate the laminar boundary layer that performs as aforementioned.

Within the high speed ranges referred to above, a mixed flow system is established in the liquid suspension around the drum, which flow system is characterized by three different, although not necessarily distinct, regions of flow. Each of these regions of flow has different hydraulic characteristics. The inner layer, or region of flow, immediately adjacent the outer periphery of the drum is a laminar boundary layer which acts as a barrier to the turbulent mixing effects of the turbulent and transition zones existing on the side of this layer more remote from the drum surface. Briefly stated, the laminar layer is maintained relatively free of the larger, more dense solid particles, which, of course, minimizes clogging of the filter and enables a greater throughput through the filter. The outer, or turbulent zone, which is characterized by the presence of random lateral mixing, exists due to the high velocity of the liquid in this zone, relative to the moving surface of the drum. Located between the laminar layer and turbulent region is a transition layer, or a region of flow, in which the characteristics randomly fluctuate between those that characterize laminar flow and those associated with turbulent flow. This region is an unstable area and its actual thickness may change from one instant to another. The creation, significance, and effect of these layers are discussed in substantial detail below.

The laminar boundary layer located immediately adjacent the outer periphery of the drum is created by the combined effects of the friction generated by the rotating drum at the interface between the drum and the fluid adjacent thereto and the viscosity of the fluid. As can be appreciated, there is essentially no relative velocity between the drum and the very next immediate layer of liquid due to the relatively high friction between this layer of liquid and the surface of the drum. However, there is a large velocity gradient across the laminar layer, which will be discussed hereinafter in greater detail. The liquid that passes through the filter media is drawn from this layer. It is well known in hydraulic phenomena that the drawing forth of the liquid from this layer helps to maintain the layer in a laminar condition. This permits higher peripheral speeds without causing the breakdown of the laminar layer, thus maximizing the viscous, shear and centrifugal effects in the system.

If the laminar layer can be kept relatively free of particulate matter, clogging of the filter is minimized, thus increasing the throughput therethrough. The laminar boundary layer is essentially free of turbulence and prevents the turbulence outside the boundary layer from bringing many of the solid particles into contact with the drum.

The essence of this invention is the creation of a condition that will set up forces that act on the solids in the suspension to be filtered, which tend to maintain the solids either in the transition, or turbulent zones, and out of the laminar boundary layer. When this is accomplished, while the very small less dense particles will probably go through the laminar layer, the larger and heavier particles will not come into direct contact with the drum and will have less chance of being eroded into smaller particles, thus reducing the number of smaller particles that flow through the filter which will substantially increase the quality of the effluent. Furthermore, the tendency of the filter media to clog, which would normally be caused by such solids, will be minimized, thus bringing about a higher flow through the filter.

The method of this invention will be described from the standpoint of the system during normal operating conditions. Under such conditons, with the drum being driven at the desired peripheral speed, the solid particles, depending on their size, rigidity, shape, and density, will either remain in the turbulent or transition zones, or will flow into the laminar boundary layer. The particles that enter the laminar layer will either flow through the filter media, or be retained in its interstices, or on its surface if the particle is larger than the pore size of the filter media.

Although the solid particles in the suspension surrounding the rotating drum are acted upon by numerous forces, there are three primary forces which most influence the drum operation. The magnitude of these three primary forces will vary depending on the relative size, rigidity and density of the particle and location of the particle in the suspension relative to the drum. One of the primary forces insofar as this invention is concerned is a force component created by the viscous shear forces acting on the solid particles, which forces are unbalanced across the particles. The imbalance of the viscous shear forces acting on the particles increases as the drum speed increases and descreases as a function of the radial distance from the drum surface. Thus, it can be seen that a particle with appreciable size and rigidity, located near the surface of the drum, will have a substantially unbalanced viscous shear force thereacross, which acts to move the particle away from the drum in an attempt to minimize the imbalance of shear forces. Stated another way, a solid particle which is relatively rigid, as compared to the viscous liquid in which it is suspended, cannot, comparactively speaking, continuously deform to dissipate energy in the manner characteristic of a viscous fluid, thus resulting in a pressure differential thereacross due to the viscous shear forces acting on its opposite sides creating a component of force acting radially outwardly away from the drum. The larger and more rigid the particle and the nearer the drum surface it is, the greater imbalance of shear forces and the greater the magnitude of the component of force tending to move the particle away from the drum.

A second significant force acting on the particle is the centrifugal force, the magnitude of which increases with inreased drum speed and the density of the solid particle and decreases in magnitude as the solid particle moves radially away from the drum surface. In other words, the higher the drum speed, the more pronounced the effect of the centrifugal force, especially on those solid particles with densities significantly greater than that of the liquid in which they are suspended.

These two forces, namely, that resulting from the unbalanced viscous shear forces and the centrifugal force, act in general opposition to the third important force that is established to cuase the liquid to flow through the filter media. This is a driving force created by the differential head pressure set up on opposing sides of the filter media. Head pressure may be as low as 4 to 8 inches, but heads of 3 to 4 feet are reasonable and heads of 10, 15, or 20 feet potentially possible. Flow through the filter increases with increased head. The optimum drum speed may also increase, since liquid is being removed from the laminar layer at a faster rate.

As previously mentioned, with the drum operating at a constant speed and the system in equilibrium, the solid particles will travel in the general direction of the rotating drum and will assume a relatively constant radial distance from the drum surface, depending on where the forces acting on the particle approach equilibrium. That is to say, when the centrifugal and unbalanced viscous shear forces acting on the particle equal the force tending to push it through the drum, the particle will remain generally at that radial distance, and will tend to travel a circular path in the direction of the rotating drum with a velocity equal to that of the liquid surrounding it.

When a solid particle of a given size and density enters the turbulent region surrounding the drum, it will move generally toward and may enter the transition zone, as long as the force on the particle pushing the particle toward the drum is greater than the oppositely directed shear and centrifugal forces. When the action of the centrifugal and shear forces on a given solid particle exceeds or equals the positive driving force tending to push the particle toward the drum before the particle has entered the transition zone, the result is that these particles remain in the turbulent zone and are subject to the random lateral mixing, which tends to randomly arrange the particles in this region as is characteristic of turbulent regions of flow.

When the imbalance of forces is such that the particle enters the transition zone, the three primary forces, i.e., shear, centrifugal, and driving head, become more influential, and the influence of the turbulent mixing is lessened. Once within the transition zone, the particle will continue to move until the oppositely acting forces are balanced. As the particle moves toward the drum, the magnitudes of all three forces increase. However, the magnitudes of the shear and centrifugal forces increase at a significantly faster rate with incremental changes in radial distance than does the magnitude of the driving force directing the flow of liquid through the filter media.

Since the centrifugal and shear forces are directly related to the size, shape, rigidity, and density of the particle, the larger and/or more dense the particle, the further away from the drum the force acting on it tends to reach equilibrium, depending on the magnitude of the force acting on the particle to move it toward the drum. The smaller and/or less dense particles will move closer to the laminar boundary layer and if the outwardly acting centrifugal and unbalanced shear forces are not sufficient to equal or exceed the inwardly acting, driving head force before the particle reaches the drum surface, they will pass through the openings in the screen and be contained in the effluent if they are sufficiently small to pass through the opening in the filter media. Those particles which reach the drum surface, but are too large to pass through the openings in the media, will attach to the filter media and tend to plug the openings, thus making cleaning necessary.

When operating the drum at a high peripheral speed, on the order of 600 feet per minute, high shear and centrifugal forces will be generated, resulting in a very efficient straining action. In the case of extremely large, low density particles, the centrifugal force will be quite small and they will tend to be kept away from the drum surface primarily by the force resulting from the unbalanced shear forces. The extremely small, but very dense particles will tend to be held away primarily by the centrifugal force effect, with only minor influence by the force resulting from the unbalanced shear forces, due to the particles' small size. The combined effect of these two forces will not only act to keep the larger particles away from the filter media, thus increasing the flow through the filter by minimizing clogging, but will also tend to keep the larger particles from coming into direct contact with the drum surface, reducing the probablity of them breaking up through attrition at the drum surface, which will increase the quality of the effluent due to there being fewer small particles in the effluent. Also, those particles which are small enough to pass through the openings in the filter media, but are dense enough that the centrifugal force is greater than the driving force, will not reach the media and thus will not be carried out of the strainer in the effluent, as would happen in conventional screening devices of this general type. With the employment of a system using high centrifugal forces, these forces can be put to use to discharge the clarified effluent from within the strainer, as will be spelled out when discussing various embodiments conforming to the present invention. However, it may be desirable to reduce the effect of the centrifugal forces on the liquid on the effluent side of the filter media due to the fact that the centrifugal forces create a pumping head which acts in direct opposition to the driving force pushing the liquid through the filter. To this end, stationary baffles can be provided on the effluent side of the filter media to prevent the liquid from being carried around with the drum.

While a peripheral speed must be maintained to maximize the centrifugal and shear effects previously discussed, it should not exceed the speed where the laminar boundary layer becomes turbulent. When the layer of liquid immediately adjacent the inner surface becomes turbulent in nature, the influence of the turbulent mixing forces becomes much more pronounced and many of the solid particles, which were heretofore maintained away from the drum surface, now are allowed to come into contact with the filter media due to the lateral mixing effects that are characteristic of turbulent flow. Essentially, completely turbulent conditions would bring more of the particles into contact with the drum, where they will then interfere with the flow through the filter media. Also, due to the fact that contact between the larger particles and the drum may cause many of them to break up by attrition, creating more small particles that can flow through the filter, the solids removal affected by the filter may be significantly decreased. Moreover, those small but dense particles which were previously maintained away from the drum are now allowed to reach the drum surface, many of which will pass through the filter media and end up in the filter effluent.

When the peripheral speed of the drum exceeds a critical value, the energy imparted to the liquid surrounding the drum becomes so great that the velocity in the outer regions of the laminar layer exceeds that critical velocity which is characteristic of laminar flow and it starts to become turbulent. When the liquid in this region starts to become turbulent, the thickness of the laminar layer will decrease, starting from its outer region. This occurs because the energy that is introduced to the liquid by the drum exceeds that which the liquid can transmit directly and in order to dissipate the excess energy, the fluid becomes turbulent and the laminar layer eventually becomes nonexistent. Stated another way, when the peripheral speed of the drum increases beyond a critical speed, or range of speeds, the effectiveness of the two outwardly acting forces, namely, the shear forces and centrifugal forces acting to keep the solids away from the drum surface, is significantly decreased, because of the fact that the turbulent mixing associated with the completely turbulent flow system tends to randomly mix the particles in the suspension, thus overriding much of the effects of the centrifugal and shear forces. When this latter effect occurs, the turbulent liquid will bring the particles into contact with the drum surface, with the result being a general decrease in the flow through the filter media, as well as a general decrease in the efficiency of the strainer to remove solids from the suspension due to the elimination of the laminar boundary layer, which previously had kept a substantial portion of the solids in the suspension from reaching the drum surface.

It must be recognized that the concentration of the solids in the influent to the strainer will have a bearing on the conditions within which the system will most optimumly operate and on the quality of the effluent produced. For example, as the influent solids concentration is increased, in general more solids will pass through the strainer and the flow through the filter will decrease, due to the fact that there is a larger number of solids which penetrate the laminar layer and reach the surface of the drum. Also, increased solids concentration causes a general decrease in the ability of a liquid to transmit energy in a laminar manner, which causes the transformation of the laminar layer to a turbulent condition to occur at a lower peripheral durm speed. Higher solids concentration causes the outer region of the layer to become turbulent at a lower speed than when the solids concentration is somewhat less.

The discussion above pertains to the system operating under normal conditions and the flow of liquid around the drum is in equilibrium. When the system is started up initially, the same forces come into play, but they tend to act as migrating forces, which act on the larger and/or more dense solid particles to move them outwardly of the drum to a distance that allows the centrifugal, shear, and driving forces to approach equilibrium.

Briefly, a relatively large dense particle that is close to the drum when the system is started up will have imposed thereon a relatively large imbalance of shear forces and a large centrifugal force. These forces will act on these particles to move them outwardly into the transition zone or turbulent region. Depending on their size and density. The relatively small and/or less dense particles will not migrate out of the laminar boundary layer and will in all likelihood pass through with the effluent or become embedded in or on the filter media.

The system can be operated with liquid-solid suspension, wherein the concentration of solids is on the order of 20 ppm. Also, the system can be effectively operated with liquid-solid suspension with much higher solids concentrations, even in excess of those solids concentrations usually associated with mixed liquor in aeration tanks.

As previously mentioned, the filter media could be cleaned by the utilization of ultrasonics, such as an ultrasonic transducer that is positioned adjacent the filter media. The transducer can be located either inside or outside of the drum. Where transducers are employed, a layer of water is usually maintained on both sides of the filter media to insure effective cleaning. Within the scope of the present invention, other cleaning methods can be employed. For example, hydrogen peroxide can be used, a tank of which would be positioned adjacent the filter and the flow therefrom would be controlled by a suitably actuated valve. Rapid gas evolution will be catalized by a special catalyst in the screen assembly, or by the particulate matter on the screen. This could provide the desired cleaning effect and act to dislodge the particles from the screen. As a side effect, the oxygen, made available by the hydrogen peroxide, would help to satisfy some of the oxygen demand of contaminants in the liquid. Also, rapidly pulsating air or pressurized water could be used for cleaning the fabric.

The method of this invention can be practiced by a variety of different types of apparatus and several embodiments have been illustrated in the attached drawings and will be briefly described herein. Another application directed to the apparatus employed and assigned to the assignee of the present invention and having Ser. No. 183,990 and a filing date of Sept. 27, 1971, can be referred to for additional details of such apparatus, if desired.

The apparatus above referred to are disclosed in the following figures, wherein:

FIG. 1 is a sectional view of a drum filter having a transducer located within the drum, wherein the effluent is pumped out of the interior of the drum;

FIG. 2 is a sectional view of another embodiment of a drum filter, wherein the effluent is withdrawn by centrifugal force;

FIG. 2a is a cross section taken along line 2—2 of FIG. 2;

Figure 3:
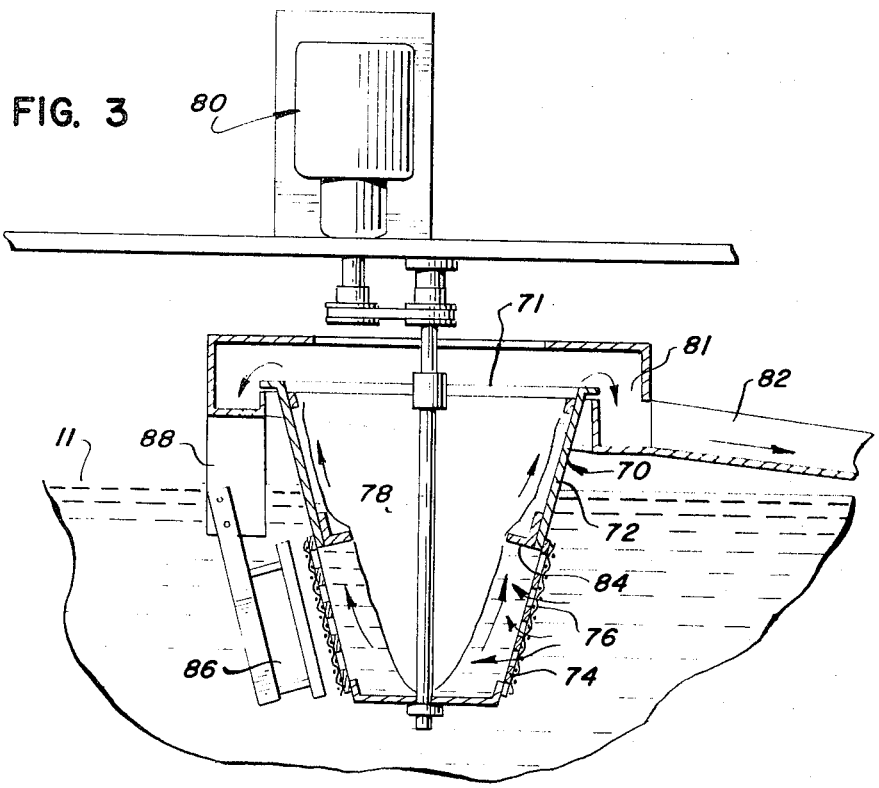
FIG. 3 illustrates another embodiment of a drum filter utilizing the generated centrifugal forces to pump the effluent out of the drum.

Referring first to FIG. 1, there is illustrated a drum filter assembly 10 disposed within a tank into which is introduced a liquid suspension to level 11 through an inlet (not shown).

The assembly 10 consists of a drum 14 having a lower perforated section 15 about which is disposed a filter media 16, which has a pore size on the order of 20 microns. The filter pore size is selected for the particular material to be filtered. The upper part 17 of the drum 14 is solid. Secured to the upper part 17 of the drum and immediately adjacent the perforated section 15 is an annular ring 19. The ring 19 insures that a layer of liquid is maintained inside the drum to insure effective ultrasonic cleaning as described hereinafter. The water level inside the drum is indicated by the numeral 21. The drum 14 is suitably secured to and driven through a drive shaft 18 by a drive assembly 20, the details of which are not important to an understanding of the present invention. The drive assembly 20 and the various stationary supports described hereinafter are secured to a frame 12. The drive assembly 20 is designed to rotate the drum at a suitable peripheral speed in the order of 350 to 900 feet per minute, which speed is selected in order to establish the desired flow regime. The speed to be selected depends on the various factors under which the system operates, such as the differential head pressure established and the character and concentration of the solids involved. Essentially, the speed of operation of the drum is selected so that the laminar boundary layer, transition layer, and turbulent zones are established within the tank in which the system is employed and the centrifugal and shear effects previously discussed are maximized.

As previously mentioned, the present invention utilizes centrifugal and viscous shear forces set up by virtue of the high peripheral speed operation of the drum to maintain the solid particles away from the filter media. In order to minimize the effect of centrifugal forces which would set up a pumping head in opposition to the driving forces moving the liquid through the filter, baffles 22 are located inside the drum adjacent the perforated section 15. The baffles 22 are secured to stationary baffle support 23 that is in turn connected to frame 12.

In the embodiment shown in FIG. 1, the liquid suspension is introduced into the tank through an inlet (not shown) and the clarified effluent that flows through the filter media to the interior of the drum 14 is pumped out through an outlet conduit 26 by a self-priming pump (not shown).

The filter media is cleaned by the utilization of an ultrasonic transducer 30 that is secured to a support plate 32 located within the drum 14. The support plate 32 is connected at its upper end to frame 12.

Referring now to FIGS. 2 and 2a, there is illustrated a filter assembly similar to that illustrated in FIG. 1, which filter assembly 40 consists of a drum 42 having an upper imperforate portion 44 and a lower perforated section 46. Located about the lower perforated section 46 is a filter media 48. The drum 42 is driven through a pulley assembly 50 rotated by a drive assembly 52, which pulley assembly is suitably connected to the top cover plate 43 of the drum 42. The drum is rotatably supported about a hollow fixed shaft 51 that is affixed at its upper end to a frame member 53 and at its lower end to a plate 56 that is held in position by a suitable support structure including braces 54.

In order to minimize the effect of centrifugal forces on the liquid on the inside of the filter media 48 in this system, stationary vanes 58 are located within the drum 42 and are secured to shaft 51 (see FIG. 2a).

The drum assembly shown in FIG. 2 utilizes the effect of centrifugal force to pump clarified effluent out of the space within the drum filter. The centrifugal force acts to move the liquid up the inner side walls of drum section 44 into an overflow trough 60. To insure that liquid remains adjacent the filter media 48 within the drum, so that the filter media 48 can be effectively cleaned ultrasonically, an annular ring 62 is secured to drum wall 44 immediately above the perforate section 46. The ultrasonic transducer 64 is suitably positioned for cleaning the filter and receives power through electrical conduits directed through hollow shaft 51.

In a further embodiment illustrated in FIG. 3, there is shown a frustoconically shaped drum 70 having an upper imperforate section 72 and a lower perforate section 74. Disclosed about the perforate section 74 is the filter media 76. The drum 70 is secured to a drive shaft 78 which is suitably rotated by a drive assembly 80, the details of which are described in copending application, Ser. No. 183,990, filed Sept. 27, 1971, and assigned to the assignee of the present invention. The upper portion of the drum 70 is re-enforced by radially extending spokes 71. This version of the drum filter assembly is designed to minimize the amount of filtered liquid against the inside of the filter media 76 thereby avoiding the need for vanes or baffles to prevent rotation of the liquid inside the drum. Also, the frustoconical configuration provides for better utilization of the centrifugal action to direct the clarified effluent within the drum up to the circular trough 81, which leads to a collector through a duct 82.

To insure the maintenance of liquid adjacent the filter media 76 so that ulrasonic cleaning can be effectively accomplished, there is provided an annular ring 84 between the lower perforate section 74 and the upper imperforate section 72. The transducer 86 for cleaning the filter media 76 is located outside the filter media 76 and is suitably secured to a support member 88 for positive location adjacent the filter media.

Figure 4:
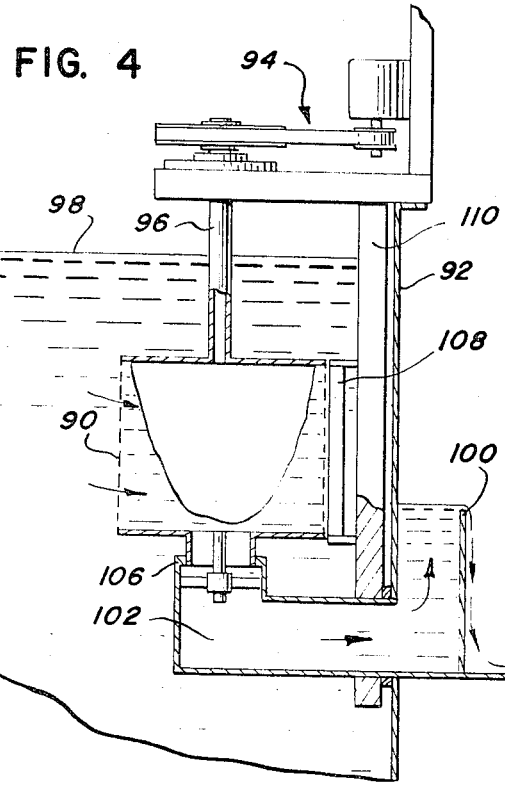
FIG. 4 is an elevation view, partially in section, showing another embodiment of a drum filter wherein the effluent flows out by gravity.

The fourth embodiment illustrated in FIG. 4 shows a drum assembly 90 that is completely immersed in a tank 92, which drum assembly 90 is rotated by drive assembly 94 through a drive shaft 96. The drum 90 is cylindrical and perforated throughout its entire length and in this respect, it is similar to the lower portion of that illustrated in FIG. 1. The shaft 96 is hollow for venting purposes.

The driving force for the liquid through the strainer results from the difference in head pressure between the liquid level 98 in the tank and the overflow weir 100. The clarified effluent flows by gravity out of the tank through the conduit 102, over the weir 100 and then out the discharge conduit 104. A suitable seal 106 is provided between the conduit 102 and the rotating drum 90.

The filter media is cleaned by an ultrasonic transducer 108 located adjacent the exterior of the drum 90 and secured to support 110.

It is recognized that in each of these embodiments the increased speed of rotation of the drum inherently results in more frequent cleaning of the filter media due to its passing of the ultrasonic transducer at closer intervals. Also, the ultrasonics will cause an instantaneous breakdown in the laminar layer at the area of the drum at which the ultrasonic energy is delivered, allowing the solids near and on the drum surface to be moved away from the filter media. However, since this is instantaneous in nature, the flow conditions set up in this system are not basically affected.

METHOD OF OPERATION

In the practice of the present invention, the drum-type filter is operated at a high peripheral speed on the order of 350 to 900 feet per minute, with even higher speeds possible. When operated at this speed, the solid particles in the liquid to be filtered by the filter are acted on by three principal forces. These are: (1) the differential pressure acting to force the liquid through the filter media; (2) the unbalanced viscous shear forces; and (3) the centrifugal force due to the high-speed rotation. The latter two forces act radially in opposition to the differential pressure acting to force the liquid through the filter.

The high-speed rotation of the filter acts in setting up a layer adjacent the exterior of the filter in which there are substantially fewer solid particles than are contained in the balance of the liquid in the tank wherein the filter is located. In the illustrated embodiments, there is set up a laminar boundary layer immediately adjacent the filter, a transition zone, which is part laminar and part turbulent, next to the laminar region, and a turbulent region outside the transition zone.

The larger the particle, the larger the effect of the unbalanced shear forces and the denser the particle the greater the centrifugal forces, with the result that the larger more dense particles will reach a balanced position further from the drum than the smaller less dense particles that will move closer to the drum or pass therethrough, depending on their size. Thus, in accordance with the present invention, the larger denser particles in a liquid suspension will be maintained outside of the laminar boundary layer, which will result in increased throughput and higher quality effluent.

The following are examples of results obtained when the apparatus is operated in the manner described by the listed operation parameters. In each of these examples, the filter media is a filter cloth wherein the opening size is normally 20 microns. Furthermore, the differential head pressure between the exterior and interior of the drum is on the order of 8 inches.

EXAMPLE I

The filter, when used for filtering a relatively dilute suspension consisting primarily of relatively large, well flocculated solids at a concentration on the order of 30–200 milligrams/liter and operated at a surface velocity of 750 feet/minute, will obtain a flow rate on the order of 16 gallons/minute/square foot of filter area and remove up to 95 percent of the solids from the liquid suspension.

EXAMPLE II

When used for filtering a solution of intermediate concentration on the order of 700 milligrams/liter and having a wide range of particle sizes, the filter is operated at a surface velocity on the order of 700 feet/minute. Under these conditions, the filtered liquid will flow through the filter at a flow rate on the order of 8 gallons/minute/square foot of filter area and about 90 percent of the solids in the liquid suspension will be removed.

EXAMPLE III

In the case of a solution of high solids concentration on the order of 2,000 milligrams/liter, the filter is operated at a surface velocity of 650 feet/minute. At this velocity, a flow rate on the order of 5 gallons/minute/square foot of surface area is obtained and the percent of solids removed from the liquid suspension is on the order of 90 percent.

It is intended to cover by the present invention any and all apparatus capable of performing the novel methods claimed herein. For example, the filter may be operated in a horizontal orientation, as well as in the vertical orientation. The filter may be capable of performing adequately without the use of any mechanical cleaning device. Also, suitably positioned vanes, located outside or inside of the drum may be used to aid in cleaning the filter media. Similarly, it must be understood that while the application has been described in terms of "three layers," or "regions," of liquid being formed outside the filter, it is, of course, understood that these "layers," or "regions," are not necessarily completely distinct. Essentially, the invention maximizes the effects of the hydraulic phenomenon resulting from the method of operation described above. Many modifications and variations can be made, which modifications if performing the claimed method fall within the true spirit and scope of the present invention.

What is claimed is:

1. A method of removing solids from an aqueous suspension in a tank having an inlet for such suspension and an outlet for clarified effluent, including the steps of directing the suspension through an endless moving screen having openings smaller than at least some of the solids in the suspension, when screen is located within the tank between the inlet and outlet, operating the screen within a range of high peripheral speeds to establish a mixed flow system in the suspension including a laminar boundary layer immediately adjacent the screen, a second adjacent region wherein the suspension is partially laminar and partially turbulent and a third turbulent region adjacent the second region, whereby the forces acting on the larger solids in suspension due to the high screen peripheral speeds and the boundary layer act to keep the larger solids away from the screen to provide for a high throughput of effluent, which effluent has a high percentage of the solids removed therefrom.

2. The method of removing solids from an aqueous suspension in a tank having an inlet for said suspension and an outlet for clarified effluent, including the steps of providing a drum within the tank having a filter media disposed thereabout which has openings smaller than at least some of the solids in the suspension and through which the aqueous suspension is forced, which effluent is directed to a tank outlet that communicates with the interior of the drum, rotating the drum within a range of high peripheral speeds to set up a mixed flow system in the suspension in the tank adjacent the exterior of the drum including a first laminar boundary layer immediately adjacent the exterior of the drum, a second layer of liquid that is in a partially laminar and partially turbulent condition and a third turbulent region adjacent said second layer, the driving head of the aqueous suspension on the solid particles in the suspension being opposed by the viscous shear and centrifugal forces on said solids, whereby the larger more dense solid particles in the suspension will be maintained outside of the laminar boundary layer to insure a high flow rate of effluent through the filter media, which effluent has a high percentage of the solids removed therefrom, and cleaning the filter media to insure a highly efficient operation.

3. The method as set forth in claim 2 wherein the drum is operated at a peripheral speed on the order of 350 to 900 feet per minute and the filter media is cleaned ultrasonically.

4. The method as set forth in claim 3 wherein the centrifugal forces imposed by high-speed rotation of the drum are employed for directing the clarified effluent to the tank outlet.

5. The method as set forth in claim 3 in which the liquid is positively maintained adjacent the inside of the filter media in the drum so that the ultrasonic cleaning can be effected.

6. The method as set forth in claim 2 including the step of minimizing the centrifugal pumping action imposed by the high-speed rotation of the drum.

7. The method as set forth in claim 6 in which baffles are employed for preventing the liquid within the drum from moving around with the drum.

8. The method of removing solids from an aqueous suspension in a tank having an inlet for said suspension and an outlet for clarified effluent, including the step of providing a drum within the tank having a filter media disposed thereabout which has openings smaller than at least some of the solids in the suspension, which effluent is directed to a tank outlet that communicates with the interior of the drum; causing a pressure differential between the interior and exterior of said drum within a range sufficient to promote effluent flow through said filter media but not so great as to cause turbulence in the suspension adjacent the exterior of the drum when the drum is rotating within a range of peripheral speeds sufficient to establish a mixed flow system in the suspension as hereinafter described; rotating the drum within a range of peripheral speeds sufficient to set up a mixed flow system in the suspension in the tank adjacent the exterior of the drum including a first laminar boundary layer immediately adjacent the exterior of the drum, a second layer of liquid that is in a partially laminar and partially turbulent condition, and a third turbulent region adjacent said second layer, the driving head of the aqueous suspension on the solid particles in the suspension being opposed by the viscous shear and centrifugal forces on said solids, whereby the larger more dense solid particles in the suspension will be maintained outside of the laminar boundary layer to insure a high flow rate of effluent through the filter media, which effluent has a high percentage of the solids removed therefrom; and cleaning the filter media to insure a highly efficient operation.

9. The method as set forth in claim 8 wherein the pressure differential is on the order of three to four feet of water and the drum is operated at a peripheral speed on the order of 350 to 900 feet per minute.

10. The method as set forth in claim 9 wherein the filter media is cleaned ultrasonically.

* * * * *